United States Patent [19]

Ishibashi

[11] 4,084,578
[45] Apr. 18, 1978

[54] SOLAR WATER HEATER OF NATURAL CIRCULATION TYPE

[75] Inventor: Toshihiro Ishibashi, Kosai, Japan

[73] Assignee: Yazaki Sogyo Kabushiki Kaisha, Tokyo, Japan

[21] Appl. No.: 668,190

[22] Filed: Mar. 18, 1976

[30] Foreign Application Priority Data

Mar. 24, 1975 Japan .............................. 50-39187[U]

[51] Int. Cl.² ................................................ F24J 3/02
[52] U.S. Cl. ...................................... 126/271; 126/270
[58] Field of Search ............... 126/271, 270; 237/1 A; 165/172–176; 29/157 BD, 157 T, 157.3 V; 138/27, 28, 32, 115

[56] References Cited

U.S. PATENT DOCUMENTS

| 705,305 | 7/1902 | Hubert | 126/271 |
|---|---|---|---|
| 1,889,238 | 11/1932 | Clark | 126/271 |
| 2,249,642 | 7/1941 | Turner | 126/271 |
| 2,910,094 | 10/1959 | Barnes et al. | 138/115 |
| 3,270,739 | 9/1966 | Thomason | 126/271 |
| 3,459,875 | 8/1969 | Fork | 138/115 |
| 3,592,956 | 7/1971 | Fork | 138/115 X |
| 3,875,926 | 4/1975 | Frank | 126/271 |
| 3,894,685 | 7/1975 | Keyes et al. | 237/1 A |
| 3,916,871 | 11/1975 | Estes et al. | 126/271 |
| 3,946,721 | 3/1976 | Keyes et al. | 126/270 |
| 3,974,824 | 8/1976 | Smith | 126/271 |
| 4,010,733 | 3/1977 | Moore | 126/271 |

FOREIGN PATENT DOCUMENTS

| 257,425 | 5/1963 | Australia | 126/271 |

*Primary Examiner*—Kenneth W. Sprague
*Assistant Examiner*—Larry Jones
*Attorney, Agent, or Firm*—Oldham, Oldham, Hudak & Weber

[57] ABSTRACT

A solar water heater of natural circulation type provided with a reflector for improving the heat collecting efficiency of a heat collector especially in the winter season. The reflector is disposed to satisfy two essential conditions. The first essential condition provides that solar radiation reflected from the reflecting surface of the reflector be substantially entirely directed toward the heat collecting surface of the heat collector at the southing time of the winter solstice, while the second essential condition provides that solar radiation incident upon the heat collecting surface of the heat collector be not excessively interrupted by the reflector at the southing time of the summer solstice.

3 Claims, 9 Drawing Figures

SOLAR WATER HEATER OF NATURAL CIRCULATION TYPE

BACKGROUND OF THE INVENTION

1. Field of the Invention

This invention relates to a solar water heater of natural circulation type, and more particularly to an improved water heater of the kind above described in which the heat collection efficiency of a heat collector disposed in inclined relation on the roof or any other suitable location of a house can be increased especially in the winter season while maintaining the same substantially equivalent to that of prior art ones in the summer season.

2. Description of the Prior Art

A prior art solar water heater of natural circulation type has a structure as shown in FIG. 1. Referring to FIG. 1, a heat collector 1 is disposed in inclined relation on the roof or any other suitable location of a house and is connected by conduits 3 and 4 to a hot-water reservoir 2 disposed at a higher level. The energy of solar radiation incident upon the water heater is converted into heat by the heat collector 1 to heat water circulating between the heat collector 1 and the hot-water reservoir 2 thereby decreasing the density of water. As a result, heated water flows upward into the hot-water reservoir 2 through the conduit 4, and at the same time, water of lower temperature in the lower part of the hot-water reservoir 2 flows downward into the heat collector 1 through the conduit 3. In this manner, water continues to circulate between the heat collector 1 and the hot-water reservoir 2 so long as the solar radiation persists and the temperature difference exists between the heat collector 1 and the hot-water reservoir 2. Water ceases to circulate when the solar radiation disappears due to sunset.

As shown in FIG. 1, the hot-water reservoir 2 is connected to a source of water (not shown) by a water feed conduit 5 which is provided at the end thereof with a ball tap 6 floating on the water level in the hot-water reservoir so that water of constant volume can be contained always within the hot-water reservoir 2. The heat collector 1 comprises metal sheets or heat collecting sheets 7 defining a plurality of water circulation passages therein. These heat collecting sheets 7 are covered at the front or heat collecting surface thereof with a glass plate 8, and the remaining portions of the heat collecting sheets 7 are covered with a layer of heat insulating material 9.

In such a prior art solar water heater of natural circulation type, however, the temperature of hot water in the reservoir 2 is not raised sufficiently in the winter season due to the fact that the temperature of feed water is lower than that in the other seasons and the amount of solar radiation is also less than that in the other seasons. It has therefore been necessary to provide a gas or oil burner for applying additional heat to hot-water supplied from the reservoir 2 to, for example, a bath so that the bath can be satisfactorily used in the winter season. (The heating of hot-water by the gas burner is commonly called supplemental heating.) Thus, the merit of the solar water heater has been considerably lost in the winter season.

The temperature of water heated by the heat collector can be raised by increasing the heat collecting efficiency per unit area of the heat collector or by enlarging the overall area of the heat collecting surface. However, the former method is defective in that there is a limit in the increase in the heat collecting efficiency, and the latter method is also defective in that mere enlargement of the heat collecting area results in an enlarged volume of the water heater and heat more than that required will be collected in the summer season. Thus, both these methods are not best in any way.

SUMMARY OF THE INVENTION

It is a primary object of the present invention to provide an improved solar water heater of natural circulation type which obviates the prior art defects pointed out above. In the present invention, a reflector is utilized to improve the heat collecting efficiency of a heat collector. The present invention is featured by the fact that not only such a reflector is utilized to improve the heat collecting efficiency of the heat collector, but also the angle defined between the reflecting surface of the reflector and the heat collecting surface of the heat collector is selected to lie within a specific range, so that the heat collecting efficiency of the heat collector can be improved especially in the winter season while maintaining the same substantially equivalent to that of prior art ones in the summer season.

BRIEF DESCRIPTION OF THE DRAWINGS

FIG. 2 shows schematically the structure of a simplest form of the solar water heater of natural circulation type according to the present invention. Referring to FIG. 2, the solar water heater of the present invention comprises an independent reflector 10 disposed fixedly or adjustably adjacent to the upper end of a heat collector 1 similar to the prior art one shown in FIG. 1. This reflector 10 is disposed to define an angle α between the reflecting surface thereof and the heat collecting surface of the heat collector 1, that is, the surface of a glass plate covering heat collecting sheets of the heat collector 1. This angle α is selected to satisfy such essential conditions that solar radiation reflected from the reflecting surface of the reflector 10 be substantially entirely directed toward the heat collecting surface of the heat collector 1 at the southing time of the winter solstice, while solar radiation incident upon the heat collecting surface of the heat collector 1 be not excessively interrupted by the reflector 10 at the southing time of the summer solstice. The material of the reflector 10 is preferably a metal having a high reflectivity such as aluminum or stainless steel, and such material may be used in non-coated form or in a form coated with a light-reflecting white material. A hot-water reservoir 2, conduits 3, 4, a feed water conduit 5, a ball tap 6, heat collecting sheets 7, a glass plate 8 and a heat insulator 9 shown in FIG. 2 are entirely similar to those shown in FIG. 1, and therefore, any detailed description thereof is unnecessary.

It will be seen from the above description that the angle $\alpha$ defined between the reflecting surface of the reflector 10 and the heat collecting surface of the heat collector 1 in the present invention is selected to satisfy the first essential condition which provides that solar radiation reflected from the reflecting surface of the reflector 10 be substantially entirely directed toward the heat collecting surface of the heat collector 1 at the southing time of the winter solstice.

Figure 3:
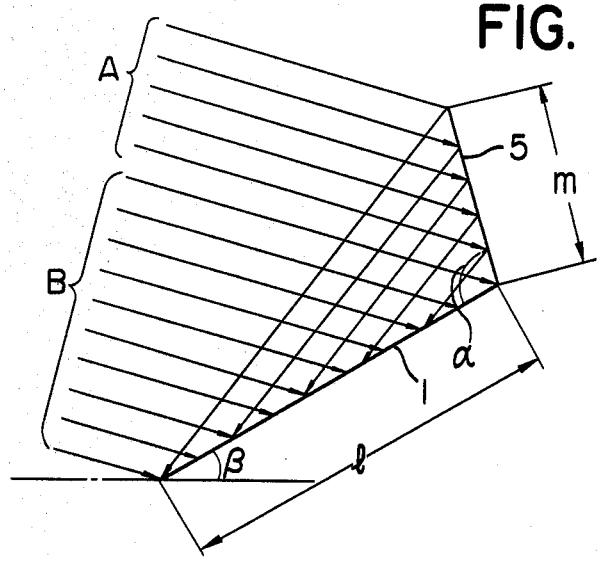
FIG. 3 shows schematically the course of solar radiation incident upon and then reflected from the heat collector and reflector in the solar water heater of the present invention.

Therefore, effective solar radiation represented by (A + B) in FIG. 3 can be obtained when the rays are incident in a direction as shown by the arrows. This means that the amount of effective solar radiation is increased by an amount A compared with the amount of effective solar radiation B obtained when the reflector 10 is not provided. According to the present invention, therefore, the heat collecting efficiency is correspondingly improved, and the highest attainable temperature level of hot-water is also correspondingly raised in the winter season to such as extent as to completely eliminate the necessity for supplemental heating of considerable degree which has inevitably been required for the prior art solar water heater which is not provided with any reflector.

According to the present invention, the angle $\alpha$ defined between the reflecting surface of the reflector 10 and the heat collecting surface of the heat collector 1 is selected to satisfy also the second essential condition which provides that solar radiation incident upon the heat collecting surface of the heat collector 1 is not excessively interrupted by the reflector at the southing time of the summer solstice. Such condition is added for the reasons described below. Although the heat collecting efficiency of the heat collector 1 in the winter season can be improved when the angle $\alpha$ defined between the reflecting surface of the reflector 10 and the heat collecting surface of the heat collector 1 is selected to meet the first essential condition, the merit of the solar water heater will be considerably lost in the other seasons, especially the summer season, when solar radiation is not substantially incident upon the heat collecting surface of the heat collector by being excessively interrupted by the reflector. Therefore, the second essential condition is required in addition to the first essential condition in determining the most suitable angle $\alpha$ between the reflecting surface of the reflector 10 and the heat collecting surface of the heat collector 1. By virtue of the combination of these two essential conditions, the heat collecting efficiency in the winter season can be remarkably improved, while the heat collecting efficiency in the summer season can be maintained substantially equivalent to that obtained without the reflector.

According to the present invention, the angle $\alpha$ defined between the reflecting surface of the reflector 10 and the heat collecting surface of the heat collector 1 is selected to meet the first and second essential conditions above specified. The practical range of this angle $\alpha$ will now be described with reference to FIGS. 4 to 7 which show the results of measurement in four different districts located at 20°, 25°, 30° and 35° N. Lat.

Referring to FIG. 3 again, the angle $\beta$ defined between the horizontal and the heat collecting surface of the heat collector 10 is selected to be a value which is obtained by substracting about 5° from the latitude.

Figure 4:
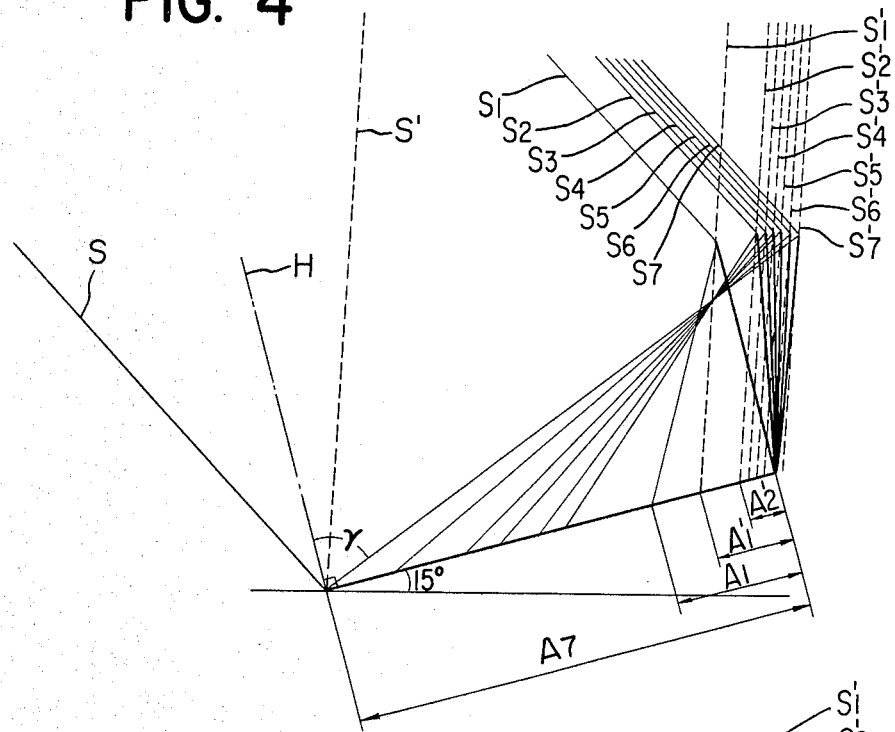
FIG. 4 to 7 show in detail the course of solar radiation incident upon and then reflected from the heat collector and reflector at the southing time of the winter solstice and summer solstice when the solar water heater is located in four districts of different latitudes and the inclination of the reflector relative to the heat collector is changed.
Figure 5:
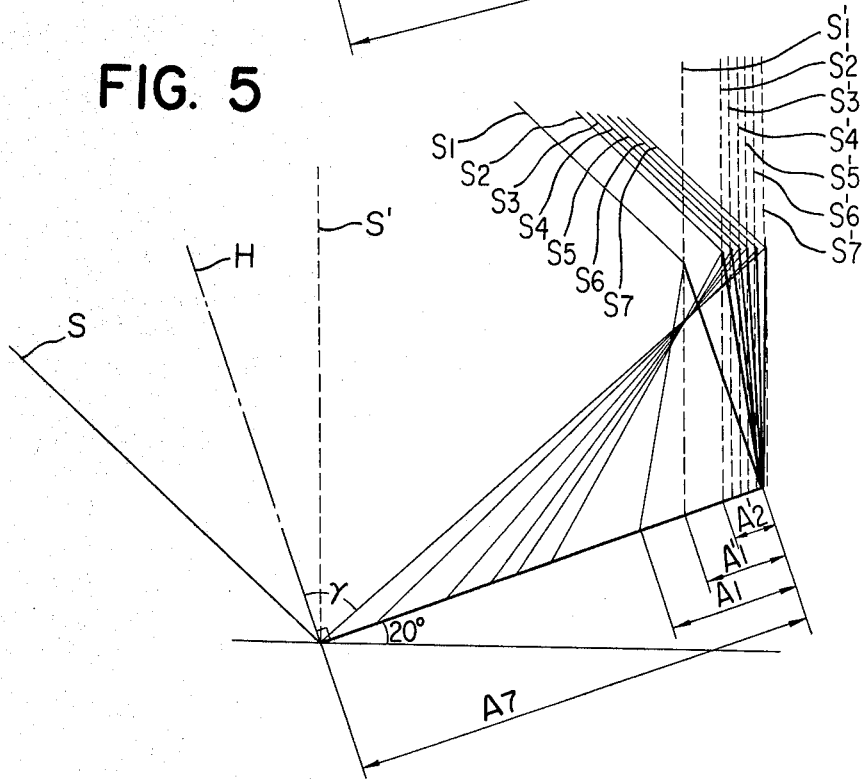
Figure 6:
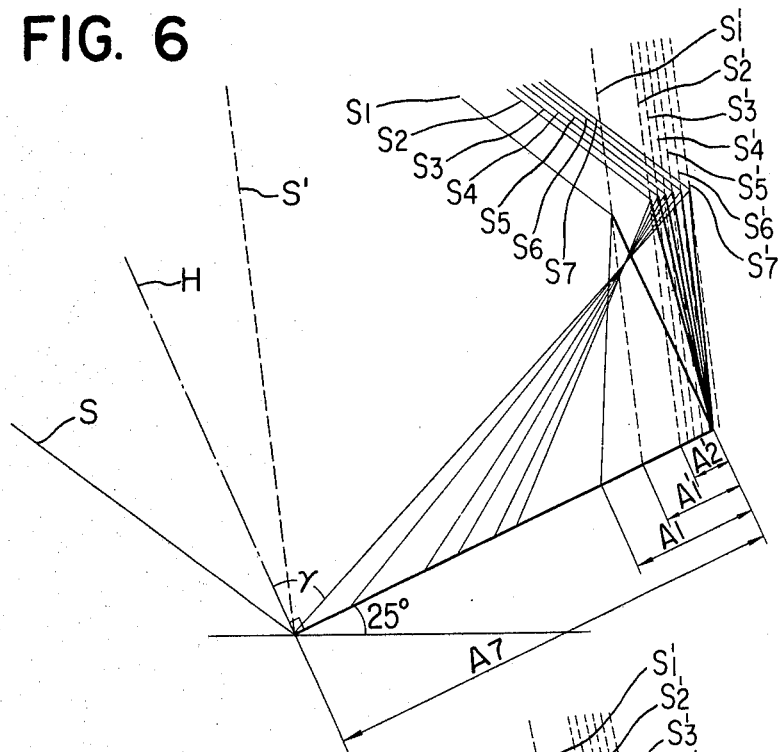
Figure 7:
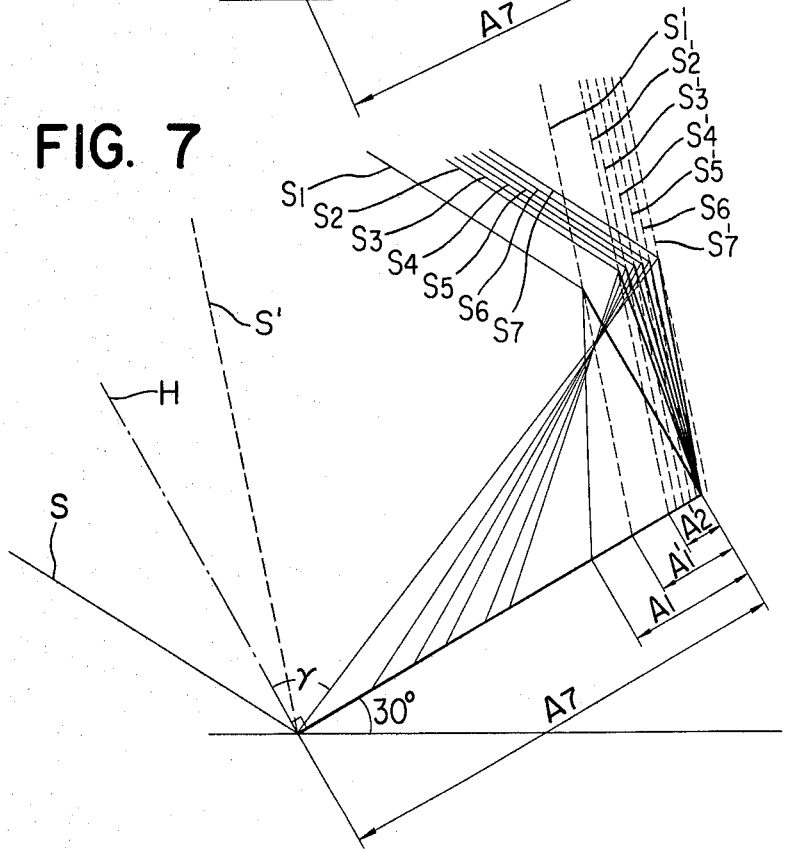

That is, even in a district of low latitude north of the Tropic of Capricorn for example, in a district of 20° N. Lat. as shown in FIG. 4, an inclination of the order of 20° − 5° = 15° can be provided to satisfy the condition for natural circulation. On the other hand, in districts of higher latitudes, the inclination is increased in proportion to the latitude so that the desired effective heat collecting area can be provided even at the southing time of the winter solstice. For example, this inclination is selected to be 30° in a district of 35° N. Lat., as shown in FIG. 7, in which the solar water heater can still operate effectively. In the angle range less than about 30°, the solar water heater of the present invention designed to store a standard amount of hot-water of, for example, 200 liters can be easily fixed by relatively simple mounting means to a suitable position of an inclined roof of a house.

In addition to the selection of the angle $\beta$ as specified above, the ratio of the length $l$ of the heat collector 1 to the length $m$ of the reflector 10 is selected to be, for example, 2 : 1 as seen in FIG. 3. On the basis of the conditions above specified, the most suitable angle $\alpha$ between the heat collecting surface of the heat collector 1 and the reflecting surface of the reflector 10 will now be sought for the districts located at 20°, 25°, 30° and 35° N. Lat.

At first, the most suitable angle $\alpha$ will be discussed which satisfies the first essential condition which provides that solar radiation reflected from the reflecting surface of the reflector 10 be substantially entirely directed toward the heat collecting surface of the heat collector 1 at the southing time of the winter solstice.

The factor which must be taken into account in the computation of this most suitable angle $\alpha$ is the angle with which solar radiation reflected from the reflector 10 is incident upon the glass plate providing the heat collecting surface of the heat collector 1. It is commonly known that the rate of reflection of light by a glass plate is substantially constant within the range of the angle of incidence of from 0° to about 70°, but it increases abruptly with the increase in the angle of incidence from 70° to 90° at which light is reflected substantially 100%.

When such a condition is also taken into consideration, the most suitable angle $\alpha$ satisfying the first essential condition must be such the solar radiation reflected from the reflector 10 at the southing time of the winter solstice be incident upon the glass plate providing the heat collecting surface of the heat collector 1 at an angle less than 70°.

Thus, when the angle $\alpha$ is most suitably selected, solar radiation reflected from the reflector 10 can be directed toward the glass plate providing the heat collecting surface of the heat collector 1 at the incidence angle less than 70° at the southing time of the winter solstice. The practical value of this angle $\alpha$ will be discussed when the angle $\beta$ between the heat collector 1 and the horizontal is set at the specific value of the latitude minus 5° in the districts located at 20°, 25°, 30° and 35° N. Lat.

FIGS. 4, 5, 6 and 7 show the courses of incident and reflected solar radiation at the southing time of the winter solstice and summer solstice when the angle $\beta$ between the heat collector and the horizontal is set at the specific value of the latitude minus 5° in the districts located at 20°, 25°, 30° and 35° N. Lat., respectively.

In FIGS. 4 to 7, the solid lines represent the courses of incident and reflected solar radiation at the southing time of the winter solstice, while the dotted lines represent those at the southing time of the summer solstice.

More specifically, in FIGS. 4 to 7, the solid line S represents the direction of the sun in the sky at the southing time of the winter solstice, and the solid lines $S_1$, $S_2$, $S_3$, $S_4$, $S_5$, $S_6$ and $S_7$ represent respectively the courses of incident and reflected solar radiation when the angle $\alpha$ is 90°, 100°, 102°, 104°, 106°, 108° and 110°. It will be apparent from FIGS. 4 to 7 that solar radiation reflected from the reflector 10 is incident upon the heat collecting surface or glass plate of the heat collector at an angle less than about 70° when the angle $\alpha$ is less than 110°. In other words, an angle $\alpha$ of about 70° is defined between the line $S_7$ and the line H normal to the heat collecting surface. When the angle $\alpha$ is more than 110°, therefore, solar radiation reflected from the reflector 10 is incident upon the glass plate providing the heat collecting surface of the heat collector 1 at an angle greater than 70° and would be entirely reflected. It is apparent from the above description that the most suitable angle $\alpha$ must be less than 110° in order to satisfy the first essential condition which provides that solar radiation reflected from the reflecting surface of the reflector 10 be substantially entirely directed toward the heat collecting surface of the heat collector 1 at the southing time of the winter solstice.

The above point will be considered from another viewpoint. As will be apparent from FIGS. 4 to 7, solar radiation reflected from the reflector 10 is directed to irradiate a zone $A_1$ of the heat collecting surface when the angle $\alpha$ is 90°, and with the increase in the angle $\alpha$, the irradiated zone is increased correspondingly until finally the entire zone $A_7$ of the heat collecting surface is irradiated by solar radiation reflected from the reflector 10 when the angle $\alpha$ is 110°. when the angle $\alpha$ exceeds 110°, a portion of solar radiation deviate from the heat collecting surface. From this aspect too, the most suitable angle $\alpha$ must be less than 110° in order that the first essential condition can be met.

The course of incident solar radiation at the southing time of the summer solstice will next be considered. In FIGS. 4 to 7, the dotted line S' represents the direction of the sun in the sky at the southing time of the summer solstice, and the dotted lines $S'_1$, $S'_2$, $S'_3$, $S'_4$, $S'_5$, $S'_6$ and $S'_7$ represent respectively the courses of incident solar radiation when the angle $\alpha$ is 90°, 100°, 102°, 104°, 106°, 108° and 110°. When the intersecting points of these dotted lines $S'_1$ to $S'_7$ with the heat collecting surface of the heat collector 1 are measured, the zones shaded by the reflector 10 due to interruption of incident solar radiation can be detected. (It will be readily understood that these zones are a negative factor which reduces the effective heat collecting area.) When the angle $\alpha$ is 90°, a zone $A'_1$ is shaded which occupies about 20% of the heat collecting surface, while when the angle $\alpha$ is 110°, a narrower zone $A'_2$ is shaded which occupies about 10% of the heat collecting surface, and thus, the shaded zone is remarkably reduced in the latter case. Therefore, the most suitable angle $\alpha$ must be greater than 100° in order to satisfy the second essential condition which provides that solar radiation incident upon the heat collecting surface of the heat collector 1 be not excessively interrupted by the reflector 10 at the southing time of the summer solstice.

It will be understood from the foregoing description that the angle $\alpha$ satisfying both the first and second essential conditions must lie within the range of 100° to 110°.

Figure 8:
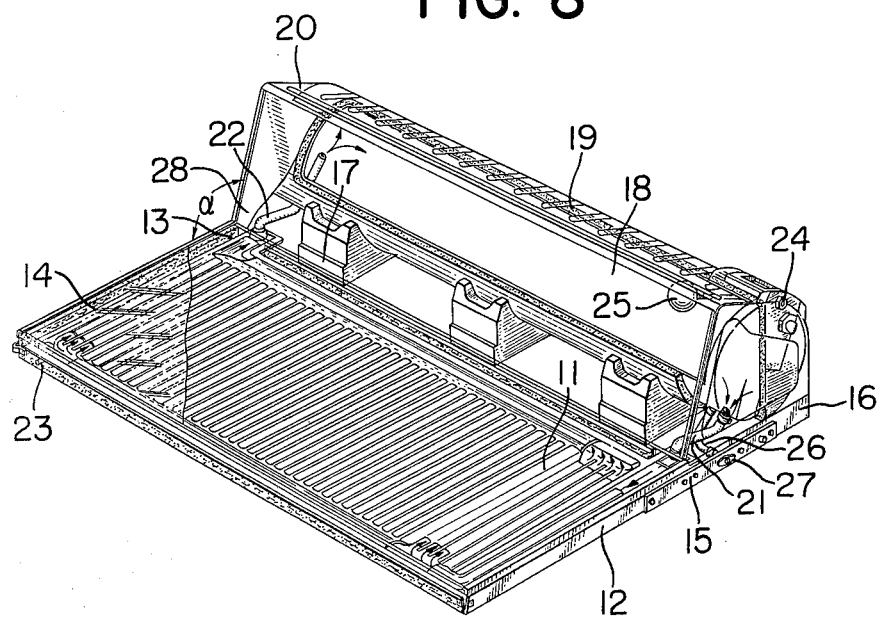
FIG. 8 is a perspective view of another embodiment of the present invention.
Figure 9:
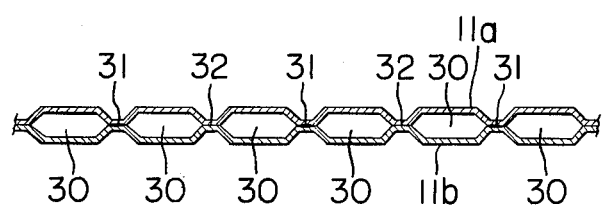
FIG. 9 is a sectional view of the heat collecting sheets of the heat collector in the solar water heater shown in FIG. 8.

FIGS. 8 and 9 show another embodiment of the present invention, in which a heat collector and a hot-water reservoir are constructed as an integral unit, and the side wall of the hot-water reservoir on the side of the heat collector is utilized as a reflector.

Referring to FIG. 8, a heat collector comprises metal sheets or heat collecting sheets 11 housed within a heat receiving casing 12 with a layer of heat insulating material 13 interposed therebetween, and a glass plate 14 providing a heat collecting surface covers the heat collecting sheets 11. The upper end of the heat receiving casing 12 is extended to provide a hot-water reservoir mounting base 16 on which a plurality of support blocks 17 are fixed to support a hot-water reservoir 18. This hot-water reservoir 18 is surrounded by a layer of heat insulating material 19 and is enclosed in a weather-proof envelope 20. The internal space of the heat collecting sheets 11 is connected to the internal space of the hot-water reservoir 18 by conduits 21 and 22. Further, the heat collector is provided with a drain port 23, and the hot-water reservoir 18 is provided with a cold-water feed port 24 connected to a source of feed water (not shown), a ball tap 25, and a hot-water feed conduit 26. The hot-water feed conduit 26 is connected to a hot-water feed port 27 formed in a connecting member 15, and this hot-water feed port 27 is connected by a conduit (not shown) to, for example, a bath.

Figure 1:
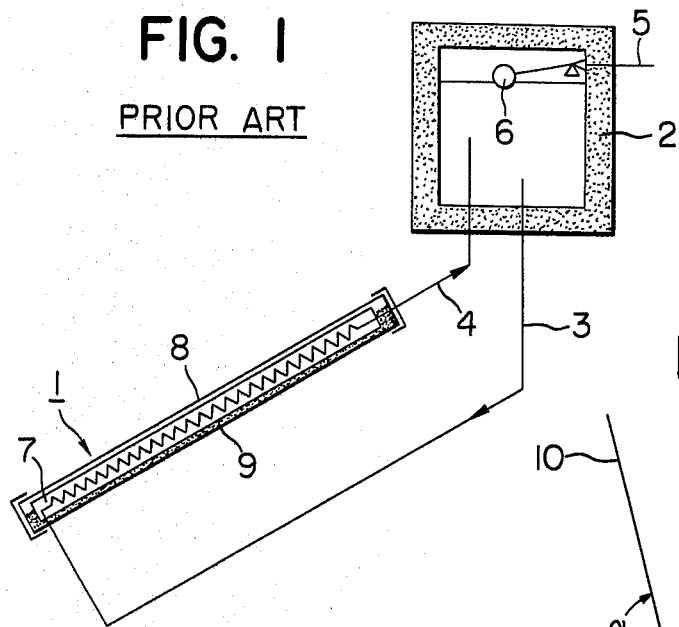
FIG. 1 is a schematic view showing the structure of a prior art solar water heater of natural circulation type.
Figure 2:
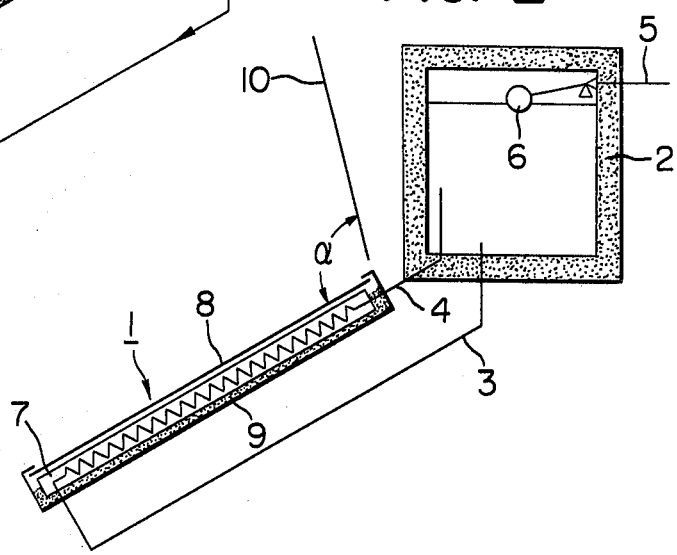
FIG. 2 is a schematic view showing the structure of a preferred embodiment of the solar water heater of natural circulation type according to the present invention.

The side wall of the envelope 20 on the side of the heat collector is formed by a highly light-reflective material such as aluminum or stainless steel to provide a reflector 28. The angle $\alpha$ defined between the reflecting surface of this reflector 28 and the glass plate 14 providing the heat collecting surface of the heat collector is selected to lie within a range as described with reference to FIG. 2. More precisely, this angle $\alpha$ is selected to lie within a range of, for example, 100° to 110°, so that solar radiation reflected from the reflecting surface of the reflector 28 can be substantially entirely directed toward the heat collecting surface of the heat collector at the southing time of the winter solstice, while solar radiation incident upon the heat collecting surface of the heat collector may not be excessively interrupted by the reflector 28 at the southing time of the summer solstice.

Thus, the second embodiment of the present invention is similarly advantageous in that the heat collecting efficiency of the heat collector is improved especially in the winter season thereby raising the highest attainable temperature level of hot water. The second embodiment has such additional advantage that the solar water heater of compact structure can be conveniently handled due to the fact that the hot-water reservoir is constructed integrally with the heat collector.

The heat collecting sheets 11 in this second embodiment have a structure as shown in FIG. 9. Referring to FIG. 9, a pair of thin sheets 11a and 11b of metal such as stainless steel are locally bent to form a plurality of joints and are seam-welded at alternate ones of these joints as shown at 31 to define a plurality of water passages 30. Therefore, each individual water passage 30 is separated from one of the adjacent water passages 30 by the welded joint 31, while it is separated from the other water passage 30 by the non-welded joint 32. This arrangement is effective in preventing occurrence of objectionable cracks or destruction at the welded joints of the heat collecting elements 11 due to freezing of water in the water passages 30 in the winter season. When the solar water heater is not in use and water remains in the water passages 30 of the heat collecting sheets 11 in the winter season, water may freeze resulting in the increase in volume. However, the increment of the volume can be absorbed by the expansion of the heat collecting sheets 11 in the areas of the non-welded joints 32, and therefore, any excessive force tending to produce cracks in or destroy the welded joints 31 is not imparted thereto.

When the ice formed in the water passages 30 melts again, the expanded non-welded joints 32 restore to the original form due to the resiliency of the thin metal sheets 11a and 11b. It is needless to say that such a structure is also applicable to the heat collector 1 shown in FIG. 2.

In the case in which all the joints 31 and 32 separating the water passages 30 are seam-welded, no expansion effective in compensating for the increment of the volume of water due to freezing can occur. Such a structure is defective in that the water passages 30 are subjected to expansion and deformation, and repetition of expansion giving rise to deformation of the water passages 30 may result in objectionable destruction of the water passages 30 due to formation of cracks in or destruction of the heat collecting sheets 11 and the welded joints.

A heat collector having welded joints on opposite sides of water passages and another heat collector having a welded joint and a non-welded joint on opposite sides of water passages were tested to prove the excellency of the latter over the former. In this test, water was filled in the water passages of the former and latter, and then, they were placed in a thermostatic vessel at −20° C for 16 hours and subsequently in another thermostatic vessel at +80° C for 8 hours. Such cycle was repeated to detect the number of cycles at which the seam-welded joints started to be destroyed. The test proved that neither destruction nor the sign of destruction was found in the latter even after 100 cycles, whereas destruction started at the welding starting or ending position of the seam-welded joints in the former after only one cycle.

While preferred embodiments of the present invention have been described in detail, it is apparent to those skilled in the art that the present invention is in no way limited to such specific embodiments, and various other changes and modifications may be made therein without departing from the spirit of the present invention.

What is claimed is:

1. A solar water heater of natural circulation type comprising a water reservoir containing a controlled amount of water therein, a flat heat collector lying in a plane and disposed in inclined relation with respect to the horizontal and connected to said water reservoir for collecting the energy of solar radiation incident thereupon thereby heating water supplied from said water reservoir, and means for causing natural circulation of water between said water reservoir and said heat collector thereby raising the temperature of water up to a value suitable for use in utilities requiring hot water supply, wherein the improvement comprises that said heat collector includes a pair of thin metal sheets defining a plurality of parallel spaced water passages, said water passages being formed by parallel immediately adjacent corrugations in at least one of said sheets having edge portions contacting the other of said sheets, one edge portion of each corrugation being welded to the other of said sheets and the second edge portion of each corrugation normally being in physical contact only with the other of said sheets.

2. A solar water heater as in claim 1 wherein said metal sheets are resilient, said corrugations extending from one sheet toward the other said sheet, and expandable units are formed from pairs of adjacent passageways having a common edge portion normally in physical contact only with the other of said sheets for controlled path water flow through the pairs of said passageways forming individual ones of said units.

3. A solar water heater of natural circulation type comprising a water reservoir containing a controlled amount of water therein, a flat heat collector lying in a plane and disposed in inclined relation with respect to the horizontal and connected to said water reservoir for collecting the energy of solar radiation incident thereupon thereby heating water supplied from said water reservoir, and means for causing natural circulation of water between said water reservoir and said heat collector thereby raising the temperature of water up to a value suitable for use in utilities requiring hot water supply, wherein said heat collector comprises a pair of thin resilient corrosion resistant metal sheets defining a plurality of spaced parallel water passages formed by locally bending and jointing a pair of such metal sheets, said sheets at the joints being selectively welded together in such a relation that each of said water passages is separated from an adjacent one by a welded joint and from the other adjacent one by a non-welded joint whereby a pair of the said passages can expand and contract as a flexible unit to avoid damage by changes in the ambient temperatures.

* * * * *